US010804721B1

(12) United States Patent
Liu (10) Patent No.: US 10,804,721 B1
(45) Date of Patent: Oct. 13, 2020

(54) EMERGENCY POWER CONTROL SYSTEM (71) Applicant: Shenzhen Segre Electronic Co., Ltd., Shenzhen, Guangdong Province (CN)

(72) Inventor: Qingjin Liu, Longyan (CN)

(73) Assignee: SHENZHEN SEGRE ELECTRONIC CO., LTD., Shenzhen, Guangdong Province (CN)

( * ) Notice: Subject to any disclaimer, the term of this patent is extended or adjusted under 35 U.S.C. 154(b) by 0 days.

(21) Appl. No.: 16/854,327

(22) Filed: Apr. 21, 2020

(30) Foreign Application Priority Data

Mar. 3, 2020 (CN) .......................... 2020 1 01388946

(51) Int. Cl.
*H02J 9/00* (2006.01)
*H02J 7/00* (2006.01)
*H02M 3/155* (2006.01)
*H02M 7/537* (2006.01)

(52) U.S. Cl.
CPC ............ *H02J 7/0068* (2013.01); *H02M 3/155* (2013.01); *H02M 7/537* (2013.01)

(58) Field of Classification Search
CPC ....... H02J 7/0068; H02M 3/155; H02M 7/537
USPC .... 307/64–66, 23, 18, 25, 80; 320/113, 116, 320/118, 121, 128, 134
See application file for complete search history.

(56) References Cited

U.S. PATENT DOCUMENTS

2013/0207616 A1* 8/2013 Shim ...................... H02J 7/0019
320/136

* cited by examiner

*Primary Examiner* — Rexford N Barnie
*Assistant Examiner* — Toan T Vu
(74) *Attorney, Agent, or Firm* — Whiteford, Taylor & Preston, LLP; Peter J. Davis (57) ABSTRACT

An emergency power supply control system includes a main control module, a power storage module, a charge module, and a discharge module. The main control module is respectively connected to the power storage module, the charge module, and the discharge module. The charge module, the power storage module, and the discharge module are connected in sequence. The power storage module includes a power storage control unit and a power storage management unit, an input end of the power storage management unit is connected to an output end of the charge module, an output end of the power storage management unit is connected to an input end of the discharge module. The input end of the power storage management unit is connected to an output end of the power storage control unit, an input end of the power storage control unit is connected to the main control module.

9 Claims, 3 Drawing Sheets

EMERGENCY POWER CONTROL SYSTEM

TECHNICAL FIELD

The disclosure relates to the technical field of emergency power supply, in particular to an emergency power supply control system.

BACKGROUND

Emergency power supplies refer to those independent power supply devices that can immediately provide emergency power supply to important loads for a short period when the normal power supply is interrupted, which are increasingly common in the field of buildings, electricity, fire protection and the like.

Requirement for power supply becomes higher and higher as urban buildings tending to be large-scale and high-rise with the development of society and the continuous improvement of the building technology. In addition, buildings tend to rely more and more on power supply due to information society together with modern buildings, especially for those important public buildings, power supply interrupt would cause serious political impact or economic loss, and unimaginable consequences would happen if fire emergency occurs.

At present, emergency power supply may be in standby condition for a quite long period. Higher requirements are put on the standby power consumption and standby duration of the emergency power supply due to energy-saving and environmental protection nowadays, so that the emergency power supply can be stored during a long period and play its due role in emergency.

SUMMARY

The disclosure is intended to solve at least one of the technical problems existing in the prior art. In this regard, it is provided an emergency power supply control system, which can reduce the standby power consumption of the emergency power supply when it is not in use, and which helps to increase the standby time, and long-term storage of the emergency power supply.

According to a first aspect, in an embodiment of the disclosure there is provided an emergency power supply control system including: a main control module, a power storage module, a charge module, and a discharge module; and the main control module is respectively connected to the power storage module, the charge module, and the discharge module; the charge module, the power storage module and the discharge module are connected in sequence; the power storage module includes a power storage control unit and a power storage management unit; an input end of the power storage management unit is connected to an output end of the charge module; an output end of the power storage management unit is connected to an input end of the discharge module; the input end of the power storage management unit is further connected to the output end of the power storage control unit; an input end of the power storage control unit is connected to the main control module; the power storage control unit includes a switching circuit, a main control circuit, and a self-locking power supply circuit; the switching circuit, the main control circuit, and the self-locking power supply circuit are connected with each other in sequence; both the switching circuit and the self-locking power supply circuit are connected to the power storage management unit.

The emergency power supply control system according to the embodiment of the disclosure may achieve at least the following technical effects: the standby power consumption of the emergency power supply is reduced and the standby time of the emergency power supply increases, which is in favor of the long-duration storage of the emergency power supply. Furthermore, the embodiment enables control of the power storage management unit through the power storage control unit, as well as self locking of the power supply circuit in the power storage control unit, thus saving power consumption. Meanwhile the self-locking power supply circuit of the power storage control unit can be shut down when no power storage output is required, and low standby power consumption and long storage duration are thus achieved.

In another embodiment, the main control circuit includes: a first main control chip, a third main control chip, and a second power supply chip; an output end of the first main control chip is connected to an input end of the power storage management unit; an output end of the power storage management unit is connected to an input end of the second power supply chip; an output end of the second power supply chip is connected to the third main control chip.

This embodiment enables communication control among the power storage control unit, the power storage management unit, and the main control module.

In an embodiment, the self-locking power supply circuit includes: a first diode, a third resistor, a fourth resistor, a fifth resistor, a sixth resistor, a first transistor, a first switch transistor, and a first power supply chip; a first end of the first diode is connected to the first main control chip; a second end of the first diode is connected to a first end of the third resistor; a second end of the third resistor is respectively connected to the base electrode of the first transistor and a first end of the fourth resistor; a second end of the fourth resistor is connected to the emitting electrode of the first transistor; the collecting electrode of the first transistor is connected to a first end of the sixth resistor; a second end of the sixth resistor is respectively connected to a first end of the fifth resistor and a third end of the first switch transistor; a second end of the fifth resistor is connected to a second end of the first switch transistor; a first end of the first switch transistor is connected to a second pin of the first power supply chip; a first pin of the first power supply chip is connected to the emitting electrode of the first transistor; a third pin of the first power supply chip is connected to the first main control chip.

This embodiment relates to a specified design of the self-locking power supply circuit, in which the self-locking power supply circuit can be conducted when the pins of first main control chip output a high level, such that self-locking power supply and low power consumption of the emergency power supply are realized.

In another embodiment, the switching circuit includes: a first switch, a second switch, a thirty-seventh resistor, a thirty-eighth resistor, a thirty-ninth resistor, a second voltage stabilizing diode, a fifth diode, and a sixth diode; a first end of the sixth diode is connected to the third main control chip; a second end of the sixth diode is connected to a second end of the fifth diode; a first end of the fifth diode is respectively connected to a first end of the thirty-eighth resistor and a first end of the first switch; a second end of the thirty-eighth resistor is respectively connected to a first end of the thirty-ninth resistor and a first end of the second switch; a second end of the thirty-ninth resistor is respectively connected to a first end of the second voltage stabilizing diode and the ground; each of a second end of the second voltage stabilizing diode, a second end of the first switch and a second end of the second switch is connected to a first end of the thirty-seventh resistor; a second end of the thirty-seventh resistor is connected to a positive terminal of the power storage management unit.

In this embodiment, the third main control chip is powered on when the first switch or the second switch is switched on, such that the foregoing self-locking power supply circuit is triggered by the sixth diode with the first main control chip powered on, such that the self-locking power supply circuit is conducted by the foregoing first diode, and power consumption is thus saved.

In another embodiment, the discharge module includes an AC discharge module and a DC discharge module; the AC discharge module includes a DC-AC conversion unit, an AC sampling unit, and an AC output unit; the DC-AC conversion unit is connected to the power management unit; the DC-AC conversion unit, the AC sampling unit, and the AC output unit are connected in sequence; both the DC-AC conversion unit and the AC sampling unit are connected to the main control module; the DC discharge module includes a DC output protection unit and a DC output unit; the DC output protection unit is respectively connected to the main control module and the power storage module; the DC output protection unit is further connected to the DC output unit.

In another embodiment, the charge module includes a DC input unit, a DC input protection unit, and a DC-DC conversion unit which are connected in sequence; an output end of the DC-DC conversion unit is respectively connected to the power storage module and the main control module.

DC input is protected at the DC input end in this embodiment, such that damage to the back-end circuit of the DC input end is alleviated.

In another embodiment, the AC sampling unit includes: a second main control chip, a twentieth resistor, a twenty-first resistor, a twenty-second resistor, a twenty-third resistor, a twenty-fourth resistor, and a second capacitor; a first end of the twentieth resistor is connected to a first end of the DC-AC conversion unit; the first end of the twentieth resistor is further connected to a first end of the twenty-first resistor; a second end of the twentieth resistor is connected to a first end of the twenty-second resistor; both a second end of the twenty-first resistor and a second end of the twenty-second resistor are connected to the second main control chip; a first end of the twenty-third resistor is connected to a second end of the DC-AC conversion unit; a second end of the twenty-third resistor is respectively connected to the second main control chip, a first end of the second capacitor, and a first end of the twenty-fourth resistor; both a second end of the second capacitor and a second end of the twenty-fourth resistor are connected to a first end of the DC-AC conversion unit.

The voltage or current of the AC output end is detected in this embodiment, and the detected voltage or current signal is fed back to the third main control chip through the second main control chip, and thus the DC-AC conversion unit can be controlled through the third main control chip.

In another embodiment of the disclosure, the DC output protection unit includes: a second power supply chip, a twenty-fifth resistor, a twenty-sixth resistor, and a twenty-seventh resistor, a twenty-eighth resistor, a twenty-ninth resistor, a thirtieth resistor, a thirty-first resistor, a thirty-second resistor, a thirty-third resistor, a thirty-fourth resistor, a thirty-fifth resistor, a third-sixth resistor, a third capacitor, a fourth capacitor, a fifth capacitor, a fourth switch transistor, a fifth switch transistor, a third transistor, and a fourth transistor; each of a first end of the third capacitor, a first end of the twenty-fifth resistor and a first end of the twenty-sixth resistor is connected to the main control module; both a second end of the third capacitor and a second end of the twenty-sixth resistor are connected to a first end of the second power supply chip; a second end of the twenty-fifth resistor is connected to a second end of the second power supply chip; each of a first end of the fourth capacitor, a first end of the twenty-seventh resistor, and a first end of the twenty-eighth resistor is connected to the main control module; each of a second end of the fourth capacitor and a second end of the twenty-eighth resistor is connected to a first end of the second power supply chip; a second end of the twenty-seventh resistor is connected to a second end of the fifth switch transistor; a third end of the fifth switch transistor is connected to a first end of the thirty-first resistor; a second end of the thirty-first resistor is connected to the collecting electrode of the fourth transistor; the emitting electrode of the fourth transistor is connected to a first end of the thirty-sixth resistor; a second end of the thirty-sixth resistor is connected to the base electrode of the fourth transistor; the base electrode of the fourth transistor is connected to a first end of the thirty-fifth resistor; a second end of the thirty-fifth resistor is connected to the main control module; a first end of the fifth switch transistor is connected to a first end of the fourth switch transistor; a second end of the fourth switch transistor is connected to a second end of the second power supply chip; a third end of the fourth switch transistor is connected to a first end of the thirty-second resistor; a second end of the thirty-second resistor is connected to the collecting electrode of the third transistor; both the emitting electrode of the third transistor and a first end of the thirty-third resistor are connected to a first end of the second power supply chip; a second end of the thirty-third resistor is connected to the base electrode of the third transistor; the base electrode of the third transistor is connected to a first end of the thirty-fourth resistor; a second end of the thirty-fourth resistor is connected to the main control module.

And voltage reverse or over-voltage breakdown damage to the DC output end resulting from an external voltage input can be effectively avoided in this embodiment.

In another embodiment, the DC input protection unit includes a ninth resistor, a tenth resistor, an eleventh resistor, a twelfth resistor, a thirteenth resistor, a fourteenth resistor, a fifteenth resistor, a sixteenth resistor, a seventeenth resistor, an eighteenth resistor, a nineteenth resistor, a second transistor, a second diode, a third diode, a fourth diode, a voltage stabilizer, a photocoupler, a first voltage stabilizing diode, a second switch transistor, a third switch transistor, and a first capacitor; a first end of the ninth resistor is connected to a first end of the DC input unit; a second end of the ninth resistor is connected to a first end of the tenth resistor; the first end of the tenth resistor is further connected to a first end of the voltage stabilizer; both a second end of the tenth resistor and a second end of the voltage stabilizer are connected to a second end of the DC input unit; the first end of the tenth resistor is further connected to a first end of the eleventh resistor; a second end of the eleventh resistor is connected to the collecting electrode of the second transistor; a third end of the voltage stabilizer is connected to a first end of the twelfth resistor; a second end of the twelfth resistor is connected to the base electrode of the second transistor; the base electrode of the second transistor is further connected to a first end of the thirteenth resistor; a second end of the thirteenth resistor is connected to the emitting electrode of the second transistor; the second end of the thirteenth resistor is further connected to a second end of the second diode; a first end of the second diode is connected to a first end of the ninth resistor; the collecting electrode of the second transistor is further connected to a first end of the third diode; a second end of the third diode is connected to a first end of the fourteenth resistor; a second end of the fourteenth resistor is connected to a second end of the DC input unit; the second end of the third diode is further connected to a second pin of the photocoupler; a first pin of the photocoupler is connected to a second end of the fourth diode; a first end of the fourth diode is connected to a first end of the sixteenth resistor; a second end of the sixteenth resistor is connected to a fourth pin of the photocoupler; a third pin of the photocoupler is respectively connected to a first end of the seventeenth resistor, a first end of the eighteenth resistor and a second end of the first voltage stabilizing diode; a second end of the eighteenth resistor is connected to a first end of the nineteenth resistor; a second end of the nineteenth resistor is connected to a second end of the first capacitor; the first end of the nineteenth resistor is further connected to a third end of a third switch transistor; a second end of the third switch transistor is connected to a second end of the first capacitor; a first end of the third switch transistor is connected to a first end of the second switch transistor; a second end of the second switch transistor is connected to a first end of the fifteenth resistor; a second end of the fifteenth resistor is respectively connected to a second end of the seventeenth resistor and a third end of the second switch transistor; and the second end of the third switch transistor is further connected to the DC-DC conversion unit. Burn down damage caused to the connected circuit following the DC input end due to a voltage input of an opposite polarity is effectively prevented in this embodiment.

DETAILED DESCRIPTION

The concepts and technical effects of the disclosure will be explicitly and completely described below for fully understanding the objectives, features and effects of the disclosure. Apparently, the described embodiments are only a part of the embodiments of the disclosure instead of the whole. And any embodiment which is reached by those skilled in the art based on the embodiments of the disclosure without any creative efforts would fall within the protection scope of the disclosure.

In the description of the disclosure, orientation descriptions if mentioned, for example, orientations or positional relationships as indicated by terms such as "upper", "lower", "front", "rear", "left", "right", etc, are based on the orientations or positional relationships shown in the drawings, and they are intended for facilitating and simplifying description of the disclosure only, but not indicating or suggesting that the referred device or element must have such a specific orientation, or be constructed and operated in such a specific orientation, and thus, those orientations or positional relationships shall not be construed as limitations to the disclosure. If a certain feature is referred to as being "provided", "fixed", "connected", or "mounted" on another feature, that feature may be directly or indirectly provided, fixed, or connected on another feature.

In the description of the embodiment of the disclosure, the term "several", if mentioned, means more than one; and the term "a plurality of", if mentioned, means more than two; and the terms "greater than", "less than", "more than", and "over", if mentioned, shall be interpreted as not including that number; and the term "above", "below" and "within", if mentioned, shall be interpreted as including that number. The term "first" and "second", if mentioned, are intended for distinguishing the technical features, and they are neither intended for any indication or suggestion for relative importance or implicit indication for the number of technical features, nor for implicit indication for the sequence of technical features.

Figure 1:
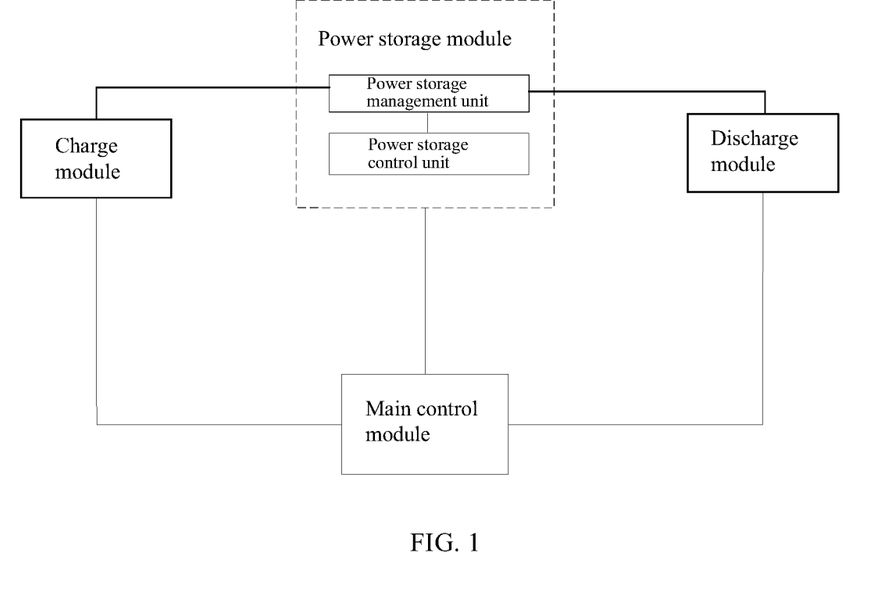
FIG. 1 is a block diagram of a specific embodiment of an emergency power supply control system according to the disclosure.

Referring to FIG. 1 which is a block diagram showing an emergency power supply control system of a specific embodiment of the disclosure according to an embodiment of the disclosure. Specifically, the system includes a main control module, a power storage module, a charge module, and a discharge module, wherein the main control module is respectively connected to the power storage module, the charge module, and the discharge module. The charge module, the power storage module, and the discharge module are connected with each other in sequence. The power storage module includes a power storage control unit and a power storage management unit, an input end of the power storage management unit is connected to an output end of the charge module, and an output end of the power storage management unit is connected to an input end of the discharge module. The input end of the power management unit is further connected to an output end of the power storage control unit, an input end of the power storage control unit is connected to the main control module.

Power control of the power storage module, and communication among the charge module, the main control module, the power storage module, and the discharge module can be achieved in this embodiment.

More specifically, the power storage management unit in the power storage module directly communicates with the charge and discharge modules in a specific communication process.

Figure 2A:
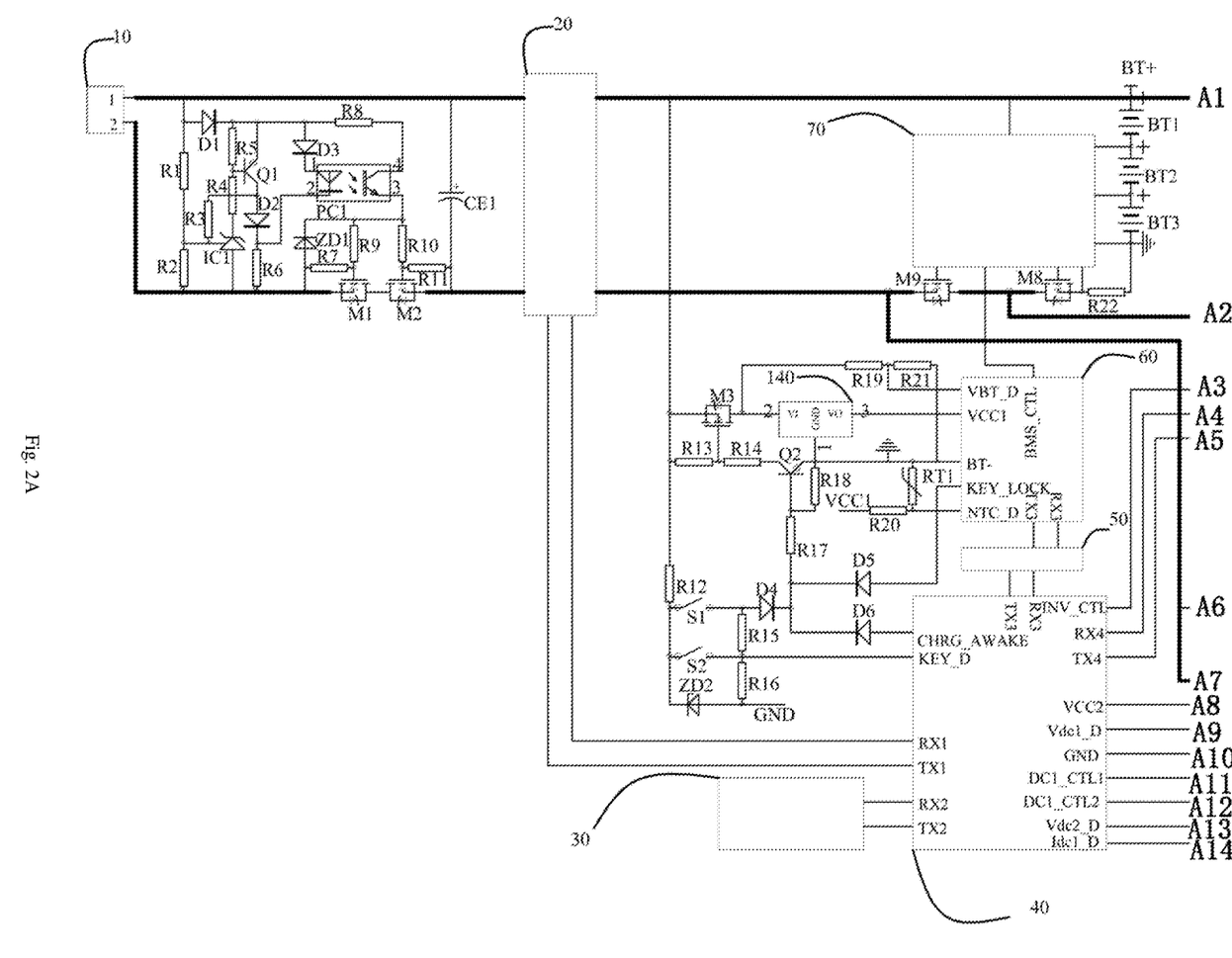
FIG. 2A is a left side view of a schematic circuit diagram of a specific embodiment of the emergency power control system according to the disclosure.
Figure 2B:
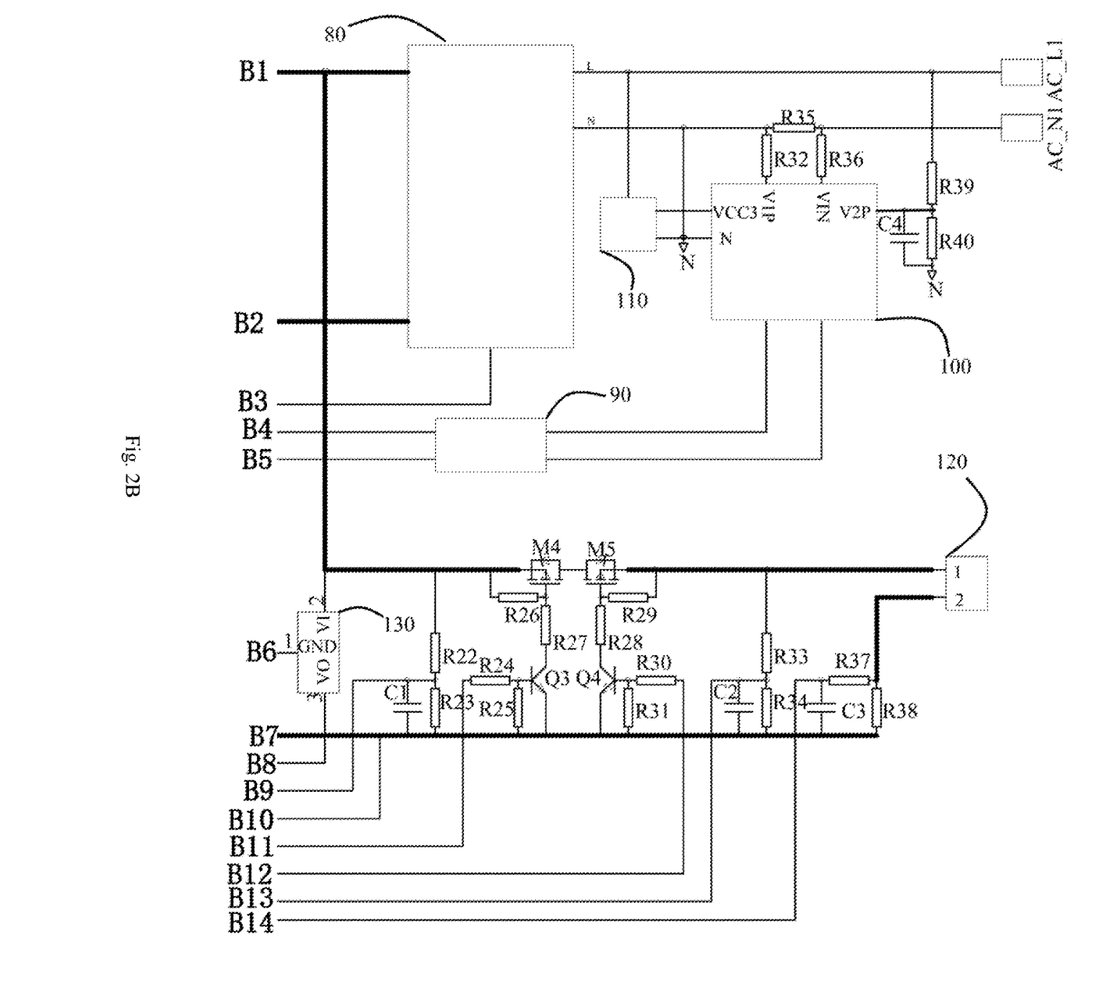
FIG. 2B is a right side view of a schematic circuit diagram of a specific embodiment of the emergency power control system according to the disclosure.

Specifically, referring to FIGS. 2A and 2B the power storage management unit 60 substantially manages the battery pack of batteries BT1, BT2, and BT3 in series. The number of batteries of the battery pack is not limited to the foregoing number, and may be more or less according to the actual situation.

Referring to FIGS. 2A and 2B, the power storage control unit includes a switching circuit, a main control circuit, and a self-locking power supply circuit, in which, the switching circuit, the main control circuit, and the self-locking power supply circuit are connected in sequence, and both of the switching circuit and the self-locking power supply circuit are connected to the power storage management unit.

Specifically, the switching circuit is respectively connected to the main control module and the power storage module for controlling activation of the main control module and the power storage module.

Specifically, the power storage module and the main control module can be switched on simultaneously by switching signal output from the switching circuit, and the battery parameters stored in the power storage module are fed back to the main control module once the power storage module is switched on. The main control module records the switching signals of the switch module and receives the battery parameters correspondingly, and controls the discharge mode of the DC discharge module and AC discharge module connected to the main control module through the recorded switch signal instructions, and the following two functions can be achieved:

(1) supplying power for DC and AC emergency loads;
(2) monitoring the discharge status of the load in real time.

Specifically, a self-locking control method is adopted between the power storage module and the main control module in this embodiment, which helps to reduce the power loss of a plurality of circuit modules, and solves the problem of large standby power consumption, and thus short standby duration, of standby emergency power products when they are not in use, and which is beneficial to the long-duration storage of emergency power.

And wherein, the battery parameters may include but not limited to the capacity, voltage, and temperature parameters, and other parameters related to batteries may be also included.

The main control circuit includes a first main control chip 60, a third main control chip 40, and a second power supply chip 130. An output end of the first main control chip 60 is connected to an input end of the power storage management unit, and an output end of the power storage management unit is connected to an input end of the second power supply chip 130, and an output end of the second power supply chip 130 is connected to the third main control chip 40.

The self-locking power supply circuit includes: a first diode D5, a third resistor R17, a fourth resistor R18, a fifth resistor R13, a sixth resistor R14, a first transistor Q2, a first switch transistor M3, and a first power supply chip 140. A first end of the first diode D5 is connected to the first main control chip 60. A second end of the first diode D5 is connected to a first end of the third resistor R17. A second end of the third resistor R17 is respectively connected to the base electrode of the first transistor Q2 and a first end of the fourth resistor R18. A second end of the fourth resistor R18 is connected to the emitting electrode of the first transistor Q2, the collecting electrode of the first transistor Q2 is connected to a first end of the sixth resistor R14. A second end of the sixth resistor R14 is respectively connected to a first end of the fifth resistor R13 and a third end of the first switch transistor M3. A second end of the fifth resistor R13 is connected to a second end of the first switch transistor M3. A first end of the first switch transistor M3 is connected to a second pin of the first power supply chip 140. A first pin of the first power supply chip 140 is connected to the emitting electrode of the first transistor Q2, a third pin of the first power supply chip 140 is connected to the first main control chip 60.

The switching circuit includes: a first switch S1, a second switch S2, a thirty-seventh resistor R12, a thirty-eighth resistor R15, a thirty-ninth resistor R16, a second voltage stabilizing diode ZD2, a fifth diode D4, a sixth diode D6. A first end of the sixth diode D6 is connected to the third main control chip 40, a second end of the sixth diode D6 is connected to a second end of the fifth diode D4. A first end of the fifth diode D4 is respectively connected to a first end of the thirty-eighth resistor R15 and a first end of the first switch S1. A second end of the thirty-eighth resistor R15 is respectively connected to a first end of the thirty-ninth resistor R16 and a first end of the second switch S2. A second end of the thirty-ninth resistor R16 is respectively connected to a first end of the second voltage stabilizing diode ZD2 and the ground. Each of a second end of the second voltage stabilizing diode ZD2, a second end of the first switch S1, and a second end of the second switch S2 is connected to a first end of the thirty-seventh resistor R12. A second end of the thirty-seventh resistor R12 is connected to the positive terminal of the power storage management unit.

Specifically, the first switch S1 is connected to the positive terminal of the power supply through the thirty-seventh resistor R12 when the first switch S1 is switched on, which conducts the fifth diode D4, and the first transistor Q2 is conducted through the third resistor R17. And since the first switch transistor M3 is under the control of the first transistor Q2, the first switch transistor M3 is also conducted at this time, and the first power supply chip 140 is caused to supply power to the first main control chip 60. The first main control chip 60 output a high level from the pin KEY_LOCK to conduct the first diode D5, the first transistor Q2 and the first switch transistor M3. And the first power supply chip 140 is conducted at this time for it is under the control of the first switch transistor M3, and as such, the first main control chip performs a complete self-locking process.

Specifically, when the emergency power is activated, a decision for a DC output or an AC output is performed according to various level values detected by the pin KEY_D of the third main controller 40 upon the pin KEY_D of the third main control 40 is connected by the first switch S1 or the second switch S2. It shall be appreciated that both the thirty-eighth resistor R15 is connected between the first switch S1 and the second switch S2 and the thirty-ninth resistor R16 is connected between the second switch S2 and the ground for voltage division, such that the level values received by the third main controller 40 are different, and the decision based on those level values can be effectively performed to further control the first main control chip 60 and the power storage management unit, thereby the power storage management unit can control the switch transistors on the power storage management unit to be switched on or off according to the level signals from the first main control chip 60 and the third main control chip 40. And the switch transistors M8 and M9 are conducted, and a DC output or an AC output can be provided where the emergency power supply works properly. It shall be appreciated that, both M8 and M9 are conducted at the same time in a charging status, and M9 is switched off by the battery management unit when the charged capacity reaches a predetermined threshold for battery pack protection, wherein the predetermined threshold is generally a value corresponding to that the battery is fully charged, and wherein the pin KEY_D on the main control chip 40 may act as a switch signal detecting pin.

Specifically, wherein the sixth diode D6 performs a wake-up function for charging. And specifically, since the first and second pins of the second power supply chip 130 are respectively connected to the negative and positive terminals of the DC input module, the second power supply chip 130 supplies power to the third main control chip 40 when input presents in the DC input module, and the sixth diode D6 is conducted through the pin CHRG_AWAKE of the third main control chip 40, thereby awakening the self-locking function described above.

And wherein, the first resistor RT1 in the circuit is a thermistor, which works with the second resistor R20 for voltage division and circuit temperature detection.

Specifically, the battery management unit 70 connected to the power control unit in this embodiment adopts a common battery management unit in the prior art, and alternatively any battery management units achieving corresponding or equivalent functions of this embodiment are feasible.

Specifically, in the standby state, a standby signal is fed back to the battery control chip IC5 through the first communication module 50 under the trigger by the third main control chip 40, and the battery control chip IC5 may turn off the self-locking power supply circuit through the pin KEY_LOCK at this time, and the battery management unit is disconnected through the pin BMS_CTL of the first main control chip IC5 at the same time, which effectively reduces the power loss of the circuit module, and solves the problem of large standby power consumption and short standby duration for the emergency power products when they are not in use, which is in favor of the long-duration storage of the emergency power supply.

In another embodiment, the discharge module is specifically designed. And the discharge module is specifically designed to include an AC discharge module and a DC discharge module.

Specifically, both the AC discharge module and the DC discharge module are connected to the main control module and the power storage module. The AC discharge module and the DC discharge module can up-transfer the corresponding signals of the discharge status to the main control module while discharging, so that the main control module can manage and monitor the AC discharge module and DC discharge module in real time. And wherein, the signals of the discharge status include but not limited to discharge voltage signals, discharge current signals, discharge power signals, and discharge temperature signals, and other signals of the discharge status may be included according to actual situations.

Specifically, the AC discharge module in the foregoing embodiment is designed in this embodiment. And the AC discharge module includes a DC-AC conversion unit, an AC sampling unit, and an AC output unit. The DC-AC conversion unit is connected to the power management unit, and the DC-AC conversion unit, AC sampling unit, and AC output unit are connected in sequence, and both the DC-AC conversion unit and the AC sampling unit are connected to the main control module.

Specifically, real-time monitoring for the AC discharge module by the main control module can be achieved in this embodiment, and more specifically, the real-time monitoring for the DC-AC conversion unit and the AC sampling unit in the AC discharge module by the main control module can be achieved, which facilitates the real-time control and protection for the AC discharge module, reducing discharge failure.

And the DC discharge module is also designed in this embodiment.

Specifically, the DC discharge module includes a DC output protection unit and a DC output unit. The DC output protection unit is respectively connected to the main control module and the power storage module, and the DC output protection unit is also connected to the DC output unit.

Signal monitoring for the DC discharge module by the main control module can be achieved in this embodiment, which stabilizes the signal of the DC discharge module, improves the DC output protection, and ensures proper operation of the DC interface of the emergency power supply.

In another embodiment of the disclosure, the charge module in the foregoing embodiment is specifically designed.

Specifically, the charge module includes a DC input unit, a DC input protection unit, and a DC-DC conversion unit which are connected in sequence, and an output end of the DC-DC conversion unit is respectively connected to the power storage module and the main control module.

Specifically, the DC charge module is respectively connected to the main control module and the power storage module. And the DC charge module converts DC power in different voltage ranges or unstable DC power into stable DC power, and supplies power to the power storage module while performing power storage. And the DC charge module feedbacks the charging status signal to the main control module, and the main control module manages and monitors the charging status of the DC charge module in real time. And wherein the charging status signal includes but not limited to charging voltage signals, charging current signals, and charging temperature signals, and other charging status signals may be also included according to actual situations.

In another embodiment of the disclosure, a display module is added to the foregoing embodiment. And the display module is connected to the main control module for displaying battery parameters and warning information.

Specifically, the display module is connected to the main control module, and can display corresponding emergency warning prompts, so that users can be informed of the real-time working status of the emergency power supply in real time, and uncertain failures of the emergency power supply in operation may be avoided, and such that emergency incidents can be handled fast and effectively.

The emergency warning prompts include but not limited to prompts for charging status warnings, the discharging status warnings, and the battery status warnings, and may also include other status warnings. The emergency incidents include but not limited to earthquakes, typhoons, and rescues, and may also include any other natural disasters or human factors which will cause power outages.

Specifically, the AC sampling unit includes a second main control chip 100, a twentieth resistor R35, a twenty-first resistor R32, a twenty-second resistor R38, a twenty-third resistor R39, a twenty-fourth resistor R40, and a second capacitor C4 A first end of the twentieth resistor R35 is connected to a first end of the DC-AC conversion unit 80, the first end of the twentieth resistor R35 is also connected to a first end of the twenty-first resistor R32. A second end of the twentieth resistor R35 is connected to a first end of the twenty-second resistor R38; and a second end of the twenty-first resistor R32 and a second end of the twenty-second resistor R38 are connected to the second main control chip 100 respectively. A first end of the twenty-third resistor R39 is connected to a second end of the DC-AC conversion unit 80; and a second end of the twenty-third resistor R39 is respectively connected to the second main control chip 100, a first end of the second capacitor C4, and a first end of the twenty-fourth resistor R40. A second end of the second capacitor C4 and a second end of the twenty-fourth resistor R40 is connected to a first end of the DC-AC conversion unit 80.

And wherein, the first end N of the DC-AC conversion unit 80 is a neutral line, and the second end L is a live line.

Specifically, the AC sampling circuit further includes a power supply unit 110, a current sampling unit including a twentieth resistor R35, a twenty-first resistor R32, and a twenty-second resistor R38, a voltage sampling unit including a twenty-third resistor R39, a twenty-fourth resistor R40 and a second capacitor C4, and a second main control chip 100. An input end of the power supply unit 110 is connected to an output end of the DC-AC conversion unit 80, and the power supply unit 110 is connected directly at an AC side for supplying power to the second main control chip 100; and the current sampling unit is configured to detect the current at the AC output end. The voltage sampling unit is configured to detect the voltage at the AC output end, the second main control chip 100 feeds back the current signal of the current sampling unit and the voltage signal of the voltage sampling unit to the third main control chip 40 through the second communication circuit 90, and the third main control chip 40 controls the DC-AC conversion circuit through the received current and voltage signals from the AC output end and through the INV_CTL port.

Specifically, the output end of the AC sampling unit is connected to the AC output unit, and the neutral line interface AC_N1 of the AC output unit is connected to a first end N of the DC-AC conversion unit 80, and the live line interface AC_L1 of the AC output unit is connected to a second end L of the DC-AC conversion unit 80.

Specifically, the DC output protection unit includes: a second power supply chip 130, a twenty-fifth resistor R22, a twenty-sixth resistor R23, a twenty-seventh resistor R33, a twenty-eighth resistor R34, a twenty-ninth resistor R37, a thirtieth resistor R38, a thirty-first resistor R28, a thirty-second resistor R27, a thirty-third resistor R25, a thirty-fourth resistor R24, a thirty-fifth resistor R30, a thirty-sixth resistor R31, a third capacitor C1, a fourth capacitor C2, a fifth capacitor C3, a fourth switch transistor M4, a fifth switch transistor M5, a third transistor Q3, a fourth transistor Q4. Each of a first end of the third capacitor C1, a first end of the twenty-fifth resistor R22 and a first end of the twenty-sixth resistor R23 is respectively connected to the main control module. Both a second end of the third capacitor C1 and a second end of the twenty-sixth resistor R23 are connected to a first end of the second power supply chip R38. A second end of the twenty-fifth resistor R22 is connected to a second end of the second power supply chip R38. Each of a first end of the fourth capacitor C2, a first end of the twenty-seventh resistor R33, and a first end of the twenty-eighth resistor R34 is connected to main control module. Both a second end of the fourth capacitor C2 and a second end of the twenty-eighth resistor R34 are connected to the first end of the second power supply chip 130. A second end of the twenty-seventh resistor R33 is connected to a second end of the fifth switch transistor M5. A third end of the fifth switch transistor M5 is connected to a first end of the thirty-first resistor R28. A second end of the thirty-first resistor R28 is connected to the collecting electrode of the fourth transistor Q4, the emitting electrode of the fourth transistor Q4 is connected to a first end of the thirty-sixth resistor R31. A second end of the thirty-sixth resistor R31 is connected to the base electrode of the fourth transistor Q4, the base electrode of the fourth transistor Q4 is connected to a first end of the thirty-fifth resistor R30. A second end of the thirty-fifth resistor R30 is connected to the main control module. A first end of the fifth switch transistor M5 is connected to a first end of the fourth switch transistor M4, a second end of the fourth switch transistor M4 is connected to the second end of the second power supply chip 130, and a third end of the fourth switch transistor M4 is connected to a first end of the thirty-second resistor R27. A second end of the thirty-second resistor R27 is connected to the collecting electrode of the third transistor Q3, the emitting electrode of the third transistor Q3 and a first end of the thirty-third resistor R25 are respectively connected to the first end of the second power supply chip 130. A second end of the thirty-third resistor R25 is connected to the base electrode of the third transistor Q3, the base electrode of the transistor Q3 is connected to a first end of the thirty-fourth resistor R24. A second end of the thirty-fourth resistor R24 is connected to the main control module.

And wherein, the thirty-first resistor R28 and the thirty-second resistor R27 are driving resistors, and the fourth switch transistor M4 is controlled by the third transistor Q3. It shall be appreciated that the fifth switch transistor M5 is controlled by the fourth transistor Q4, and the fourth switch transistor M4 is turned on correspondingly when the third transistor Q3 is turned on, and for the same reason, the fifth switch transistor M5 is turned on when the fourth transistor Q4 is turned on, and the fourth switch transistor M4 is turned off correspondingly when the third transistor Q3 is turned off, and the fifth switch transistor M5 is turned off when the fourth transistor Q4 is turned off.

Specifically, the DC output protection circuit is connected to the main control module, and wherein the DC output protection circuit includes an input voltage sampling unit including a twenty-fifth resistor R22, a twenty-sixth resistor R23, and a third capacitor C1, an output voltage sampling unit including a twenty-seventh resistor R33, a twenty-eighth resistor R34, and a fourth capacitor C2, an output current sampling unit including a twenty-ninth resistor R37, a thirtieth resistor R38, and a fifth capacitor C3, and an output control unit including a fourth switch transistor M4, a fifth switch transistor M5, a third transistor Q3, and a fourth transistor Q4. The DC output protection circuit is controlled by a third main control chip 40 in the main control module.

Specifically, the Vdc1_D port of the third main control chip 40 is connected to the input voltage sampling unit for detecting the voltage at the input end of the DC output protection circuit, so as to prevent the power storage module from under-voltage discharging which may cause damage to the power storage batteries. The Vdc2_D port is connected to the output voltage sampling unit for detecting the voltage at the DC output end. When the output control unit is in a cut-off status, the Vdc2_D port first detect the voltage at the DC output end to determine whether there is an external voltage input at the DC output, so as to avoid voltage reversion or over-voltage breakdown damage resulting from the external voltage input at the DC output end, protecting the DC output end from over-voltage damage. The Idc1_D port is connected to the output current sampling unit for detecting the current at the DC output end, the DC1_CTL1 and DC1_CTL2 ports are connected to the output control unit for controlling the conduction or cutoff of the output control unit. When no external voltage is detected at the DC output end by the output voltage sampling unit via Vdc2_D port, the DC1_CTL1 port outputs a signal to switch on the fourth switch transistor M4 in the output control unit, at this time, a BT+ signal connected to the input end of the fourth switch transistor M4 is output to the input end of the fifth switch transistor M5 through the fourth switch M4. And the BT+ signal can only be output to the DC output end through the body diode in the fifth switch transistor M5 as the fifth switch transistor M5 is in the cut-off status, and the Idc1_D port detects the current signal in the output current sampling unit, to determine whether there exists a load at the DC output end or the value of the load. The DC1_CTL2 port outputs a signal to switch on the fifth switch transistor M5 in the output control unit when the presence of the load is detected at the DC output end, and the Idc1_D port monitors and detects the current signal in the output current sampling unit in real time, and detects whether or not a short-circuit or over-current appears at the DC output end, and the DC output end is cut off immediately by the output control unit via the DC1_CTL1 and DC1_CTL2 ports if so, and thus avoiding a short-circuit or over-current problem appears at the DC output end.

It shall be appreciated that, after passing through the DC output protection unit the power signal reaches the DC output unit 20 which provides a DC power connection port for the external load.

Specifically, the DC input protection unit includes a ninth resistor R1, a tenth resistor R2, an eleventh resistor R3, a twelfth resistor R4, a thirteenth resistor R5, a fourteenth resistor R6, a fifteenth resistor R7, a sixteenth resistor R8, a seventeenth resistor R9, an eighteenth resistor R10, a nineteenth resistor R11, a second transistor Q1, a second diode D1, a third diode D2, a fourth diode D3, a voltage stabilizer IC1, a photocoupler PC1, a first voltage stabilizing diode ZD1, a second switch transistor M1, a third switch transistor M2, a first capacitor CE1. A first end of the ninth resistor R1 is connected to a first end of the DC input unit. A second end of the ninth resistor R1 is connected to a first end of the tenth resistor R2, and the first end of the tenth resistor R2 is also connected to a first end of the voltage stabilizer IC1. A second end of the tenth resistor R2 and a second end of the voltage stabilizer IC1 are respectively connected to a second end of the DC input unit. The first end of the tenth resistor R2 is also connected to a first end of the eleventh resistor R3, a second end of the eleventh resistor R3 is connected to the collecting electrode of the second transistor Q1. A third end of the voltage stabilizer IC1 is connected to a first end of the twelfth resistor R4, a second end of the twelfth resistor R4 is connected to the base electrode of the second transistor Q1, and the base electrode of the second transistor Q1 is also connected to a first end of the thirteenth resistor R5. A second end of the thirteenth resistor R5 is connected to the emitting electrode of the second transistor Q1, the second end of the thirteenth resistor R5 is also connected to a second end of the second diode D1. A first end of the second diode D1 is connected to a first end of the ninth resistor R1. The collecting electrode of the second transistor Q1 is also connected to a first end of the third diode D2. A second end of the third diode D2 is connected to a first end of the fourteenth resistor R6. A second end of the fourteenth resistor R6 is connected to a second end of the DC input unit. The second end of the third diode D2 is also connected to a second pin of the photocoupler PC1, a first pin of the photocoupler PC1 is connected to a second end of the fourth diode D3. A first end of the fourth diode D3 is connected to a first end of the sixteenth resistor R8. A second end of the sixteenth resistor R8 is connected to a fourth pin of the photocoupler PC1. A third pin of the photocoupler PC1 is respectively connected to a first end of the seventeenth resistor R9, a first end of the eighteenth resistor R10, and a second end of the first voltage stabilizing diode ZD1. A second end of the eighteenth resistor R10 is connected to a first end of the nineteenth resistor R11, a second end of the nineteenth resistor R11 is connected to a second end of the first capacitor CE1, the first end of the nineteenth resistor R11 is also connected to a third end of the third switch transistor M2. A second end of the third switch transistor M2 is connected to a second end of the first capacitor CE1. A first end of the third switch transistor M2 is connected to a first end of the second switch transistor M1. A second end of the second switch transistor M1 is connected to a first end of the fifteenth resistor R7. A second end of the fifteenth resistor R7 is respectively connected to a second end of the seventeenth resistor R9 and a third end of the second switch transistor M1. The second end of the third switch transistor M2 is also connected to the DC-DC conversion unit.

Specifically, the first end and the second end of the first capacitor CE1 are also connected to the DC-DC conversion unit 100 respectively, which performs a good filtering function. The ninth resistor R1 and the tenth resistor R2 substantially limits the voltage, and the eleventh resistor R3, the ninth resistor R1 and the tenth resistor R2 can form a voltage loop, and good over-voltage protection is thus performed. The twelfth resistor R4 is a current limiting resistor for the voltage stabilizer IC1, and can work as a bias resistor for the second transistor Q1, which adjusts the bias current of the base electrode of the second transistor Q1, so that the second transistor Q1 works at a proper operating point.

Specifically, referring to FIGS. 2A and 2 B, the power signal input from the DC input end 10 is transmitted to the DC-DC conversion unit 20 after passing through the DC protection unit. The DC input protection unit includes a voltage sampling unit including a ninth resistor R1, a tenth resistor R2, and a voltage stabilizer IC1, a control unit including a twelfth resistor R4, a thirteenth resistor R5, a fourteenth resistor R6, a third diode D2, and a second transistor Q1, a driving unit including a fourth diode D3, a fifteenth resistor R7, a sixteenth resistor R8, a seventeenth resistor R9, a voltage stabilizing diode 71, and a photocoupler PC1, and a switch unit including a second switch transistor M1, and a third switch transistor M2. The fifteenth resistor R7 and the sixteenth resistor R8 are the driving resistors for the first switch transistor M3, and the voltage of the batteries are detected through the fifteenth resistor R7 and the sixteenth resistor R8 upon the first switch transistor M3 is switched on. The eleventh resistor R3 performs voltage compensation, and performs over-voltage protection when the third diode D2 is switched on. The twelfth resistor R4 performs current limiting for the voltage stabilizer IC1. The voltage stabilizer IC1 is a TL431-type voltage stabilizer in this embodiment, and other programmable voltage stabilizers may also work. The DC-DC conversion unit 100 is a conventional DC-DC conversion unit, and those devices or apparatus performing the same DC-DC conversion function of this solution can be used alternatively.

Specifically, the resistance value of the ninth resistor R1 and the tenth resistor R2 in the voltage sampling unit can be adjusted to change the maximum voltage protection point of the DC input end. The on or off of input end of the photocoupler PC1 is controlled through the control unit by controlling on or off of the second transistor Q1. The driving unit drives the second switch transistor M1 and the third switch transistor M2 (act as switches) to be on or off through the on or off of the photocoupler PC1, so as to avoid high-voltage breakdown damage to the circuits connected to the DC input end resulting from high voltage input devices connected to the DC input end by mistake. Since the input end of the optocoupler PC1 is connected to the DC input end, and the input of the optocoupler PC1 will be cut off in reverse when voltage with an opposite polarity is input, and the optocoupler PC1 stops working and the circuit with a switch function is cut off at the same time, and thus avoiding the problem of circuit damage caused by connection of input devices with an opposite polarity to the DC input end. The problem of burn down damage to the internal circuit of the emergency power supply connected to the DC input end caused by the connection of input devices with an opposite polarity to the DC input end is thus effectively solved.

Although the embodiments of the disclosure are described in detail above with reference to the drawings, but the disclosure is not limited to the above embodiments, and within the scope of knowledge of those skilled in the art, various modifications can be made within the purpose of the disclosure. In addition, embodiments and features of embodiments of the disclosure can be combined with each other without conflict.

The invention claimed is:

1. An emergency power supply control system, comprising: a main control module, a power storage module, a charge module, and a discharge module; wherein the main control module is respectively connected to the power storage module, the charge module, and the discharge module; the charge module, the power storage module and the discharge module are connected in sequence; the power storage module comprises a power storage control unit and a power storage management unit; an input end of the power storage management unit is connected to an output end of the charge module; an output end of the power storage management unit is connected to an input end of the discharge module; the input end of the power storage management unit is further connected to the output end of the power storage control unit; an input end of the power storage control unit is connected to the main control module; the power storage control unit comprises a switching circuit, a main control circuit, and a self-locking power supply circuit; the switching circuit, the main control circuit, and the self-locking power supply circuit are connected in sequence; both the switching circuit and the self-locking power supply circuit are connected to the power storage management unit.

2. The emergency power supply control system according to claim 1, wherein the main control circuit comprises: a first main control chip, a third main control chip, and a second power supply chip; wherein an output end of the first main control chip is connected to an input end of the power storage management unit; an output end of the power storage management unit is connected to an input end of the second power supply chip; an output end of the second power supply chip is connected to the third main control chip.

3. The emergency power supply control system according to claim 2, wherein the self-locking power supply circuit comprises: a first diode, a third resistor, a fourth resistor, a fifth resistor, a sixth resistor, a first transistor, a first switch transistor, and a first power supply chip; wherein a first end of the first diode is connected to the first main control chip; a second end of the first diode is connected to a first end of the third resistor; a second end of the third resistor is respectively connected to the base electrode of the first transistor and a first end of the fourth resistor; a second end of the fourth resistor is connected to the emitting electrode of the first transistor; the collecting electrode of the first transistor is connected to a first end of the sixth resistor; a second end of the sixth resistor is respectively connected to a first end of the fifth resistor and a third end of the first switch transistor; a second end of the fifth resistor is connected to a second end of the first switch transistor; a first end of the first switch transistor is connected to a second pin of the first power supply chip; a first pin of the first power supply chip is connected to the emitting electrode of the first transistor; a third pin of the first power supply chip is connected to the first main control chip.

4. The emergency power control system according to claim 2, wherein the switching circuit comprises: a first switch, a second switch, a thirty-seventh resistor, a thirty-eighth resistor, a thirty-ninth resistor, a second voltage stabilizing diode, a fifth diode, and a sixth diode; wherein a first end of the sixth diode is connected to the third main control chip; a second end of the sixth diode is connected to a second end of the fifth diode; a first end of the fifth diode is respectively connected to a first end of the thirty-eighth resistor and a first end of the first switch; a second end of the thirty-eighth resistor is respectively connected to a first end of the thirty-ninth resistor and a first end of the second switch; a second end of the thirty-ninth resistor is respectively connected to a first end of the second voltage stabilizing diode and the ground; each of a second end of the second voltage stabilizing diode, a second end of the first switch and a second end of the second switch is connected to a first end of the thirty-seventh resistor; a second end of the thirty-seventh resistor is connected to a positive terminal of the power storage management unit.

5. The emergency power control system according to claim 1, wherein the discharge module comprises: an AC discharge module and a DC discharge module; the AC discharge module comprises a DC-AC conversion unit, an AC sampling unit, and an AC output unit; wherein the DC-AC conversion unit is connected to the power management unit; the DC-AC conversion unit, the AC sampling unit, and the AC output unit are connected in sequence; both the DC-AC conversion unit and the AC sampling unit are connected to the main control module; the DC discharge module comprises a DC output protection unit and a DC output unit; the DC output protection unit is respectively connected to the main control module and the power storage module; the DC output protection unit is further connected to the DC output unit.

6. The emergency power supply control system according to claim 5, wherein the charge module comprises: a DC input unit, a DC input protection unit, and a DC-DC conversion unit which are connected in sequence; an output end of the DC-DC conversion unit is respectively connected to the power storage module and the main control module.

7. The emergency power supply control system according to claim 5, wherein the AC sampling unit comprises: a second main control chip, a twentieth resistor, a twenty-first resistor, a twenty-second resistor, a twenty-third resistor, a twenty-fourth resistor, and a second capacitor; wherein a first end of the twentieth resistor is connected to a first end of the DC-AC conversion unit; the first end of the twentieth resistor is further connected to a first end of the twenty-first resistor; a second end of the twentieth resistor is connected to a first end of the twenty-second resistor; both a second end of the twenty-first resistor and a second end of the twenty-second resistor are connected to the second main control chip; a first end of the twenty-third resistor is connected to a second end of the DC-AC conversion unit; a second end of the twenty-third resistor is respectively connected to the second main control chip, a first end of the second capacitor, and a first end of the twenty-fourth resistor; both a second end of the second capacitor and a second end of the twenty-fourth resistor are connected to a first end of the DC-AC conversion unit.

8. An emergency power supply control system according to claim 5, wherein the DC output protection unit comprises: a second power supply chip, a twenty-fifth resistor, a twenty-sixth resistor, and a twenty-seventh resistor, a twenty-eighth resistor, a twenty-ninth resistor, a thirtieth resistor, a thirty-first resistor, a thirty-second resistor, a thirty-third resistor, a thirty-fourth resistor, a thirty-fifth resistor, a third-sixth resistor, a third capacitor, a fourth capacitor, a fifth capacitor, a fourth switch transistor, a fifth switch transistor, a third transistor, and a fourth transistor; wherein each of a first end of the third capacitor, a first end of the twenty-fifth resistor and a first end of the twenty-sixth resistor is connected to the main control module; both a second end of the third capacitor and a second end of the twenty-sixth resistor are connected to a first end of the second power supply chip; a second end of the twenty-fifth resistor is connected to a second end of the second power supply chip; each of a first end of the fourth capacitor, a first end of the twenty-seventh resistor, and a first end of the twenty-eighth resistor is connected to the main control module; each of a second end of the fourth capacitor and a second end of the twenty-eighth resistor is connected to a first end of the second power supply chip; a second end of the twenty-seventh resistor is connected to a second end of the fifth switch transistor; a third end of the fifth switch transistor is connected to a first end of the thirty-first resistor; a second end of the thirty-first resistor is connected to the collecting electrode of the fourth transistor; the emitting electrode of the fourth transistor is connected to a first end of the thirty-sixth resistor; a second end of the thirty-sixth resistor is connected to the base electrode of the fourth transistor; the base electrode of the fourth transistor is connected to a first end of the thirty-fifth resistor; a second end of the thirty-fifth resistor is connected to the main control module; a first end of the fifth switch transistor is connected to a first end of the fourth switch transistor; a second end of the fourth switch transistor is connected to a second end of the second power supply chip; a third end of the fourth switch transistor is connected to a first end of the thirty-second resistor; a second end of the thirty-second resistor is connected to the collecting electrode of the third transistor; both the emitting electrode of the third transistor and a first end of the thirty-third resistor are connected to a first end of the second power supply chip; a second end of the thirty-third resistor is connected to the base electrode of the third transistor; the base electrode of the third transistor is connected to a first end of the thirty-fourth resistor; a second end of the thirty-fourth resistor is connected to the main control module.

9. The emergency power supply control system according to claim 5, wherein the DC input protection unit comprises: a ninth resistor, a tenth resistor, an eleventh resistor, a twelfth resistor, a thirteenth resistor, a fourteenth resistor, a fifteenth resistor, a sixteenth resistor, a seventeenth resistor, an eighteenth resistor, a nineteenth resistor, a second transistor, a second diode, a third diode, a fourth diode, a voltage stabilizer, a photocoupler, a first voltage stabilizing diode, a second switch transistor, a third switch transistor, and a first capacitor; wherein a first end of the ninth resistor is connected to a first end of the DC input unit; a second end of the ninth resistor is connected to a first end of the tenth resistor; the first end of the tenth resistor is further connected to a first end of the voltage stabilizer; both a second end of the tenth resistor and a second end of the voltage stabilizer are connected to a second end of the DC input unit; the first end of the tenth resistor is further connected to a first end of the eleventh resistor; a second end of the eleventh resistor is connected to the collecting electrode of the second transistor; a third end of the voltage stabilizer is connected to a first end of the twelfth resistor; a second end of the twelfth resistor is connected to the base electrode of the second transistor; the base electrode of the second transistor is further connected to a first end of the thirteenth resistor; a second end of the thirteenth resistor is connected to the emitting electrode of the second transistor; the second end of the thirteenth resistor is further connected to a second end of the second diode; a first end of the second diode is connected to a first end of the ninth resistor; the collecting electrode of the second transistor is further connected to a first end of the third diode; a second end of the third diode is connected to a first end of the fourteenth resistor; a second end of the fourteenth resistor is connected to a second end of the DC input unit; the second end of the third diode is further connected to a second pin of the photocoupler; a first pin of the photocoupler is connected to a second end of the fourth diode; a first end of the fourth diode is connected to a first end of the sixteenth resistor; a second end of the sixteenth resistor is connected to a fourth pin of the photocoupler; a third pin of the photocoupler is respectively connected to a first end of the seventeenth resistor, a first end of the eighteenth resistor and a second end of the first voltage stabilizing diode; a second end of the eighteenth resistor is connected to a first end of the nineteenth resistor; a second end of the nineteenth resistor is connected to a second end of the first capacitor; the first end of the nineteenth resistor is further connected to a third end of a third switch transistor; a second end of the third switch transistor is connected to a second end of the first capacitor; a first end of the third switch transistor is connected to a first end of the second switch transistor; a second end of the second switch transistor is connected to a first end of the fifteenth resistor; a second end of the fifteenth resistor is respectively connected to a second end of the seventeenth resistor and a third end of the second switch transistor; the second end of the third switch transistor is further connected to the DC-DC conversion unit.

* * * * *